(No Model.)
W. O. PHILLIPS.
FLOOD GATE.
No. 580,892.
2 Sheets—Sheet 1.
Patented Apr. 20, 1897.
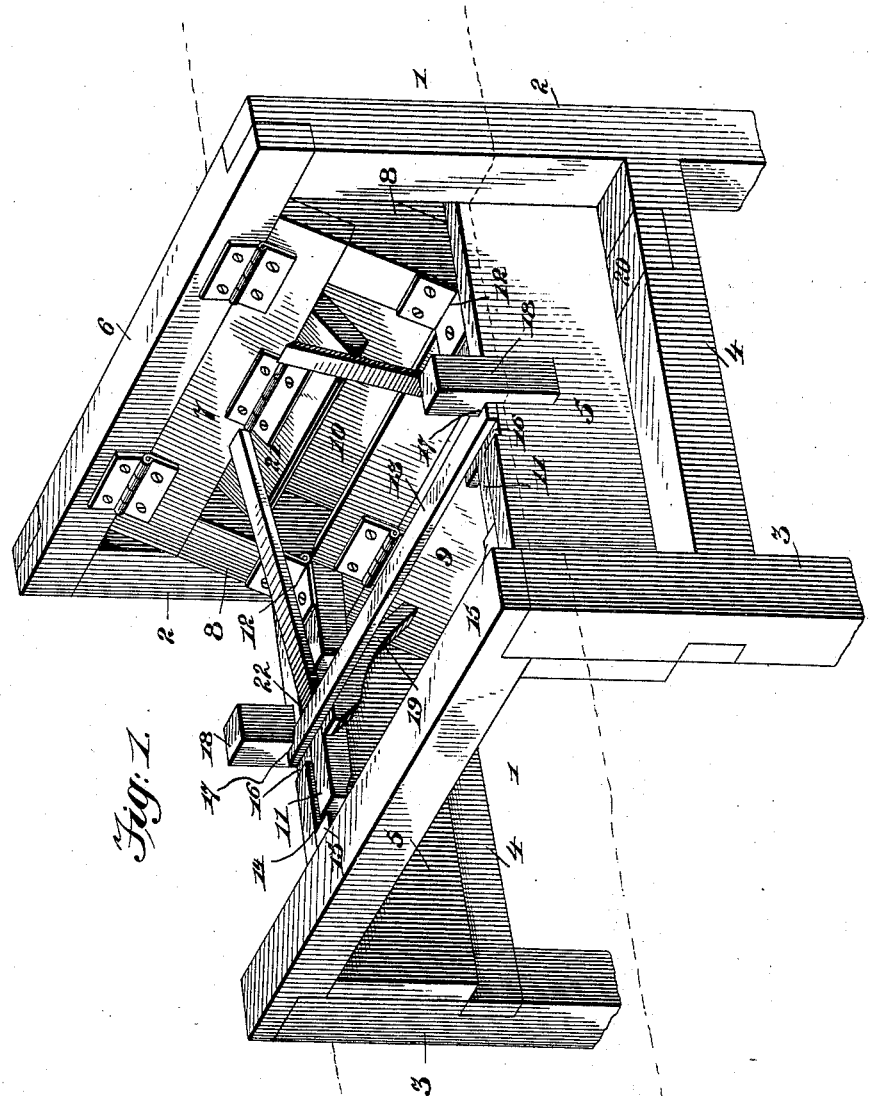
Witnesses
H. G. Dieterich
J. F. F. Riley
Inventor
William O. Phillips
By his Attorneys,
C. A. Snow & Co.

(No Model.) 2 Sheets—Sheet 2.
W. O. PHILLIPS.
FLOOD GATE.
No. 580,892. Patented Apr. 20, 1897.
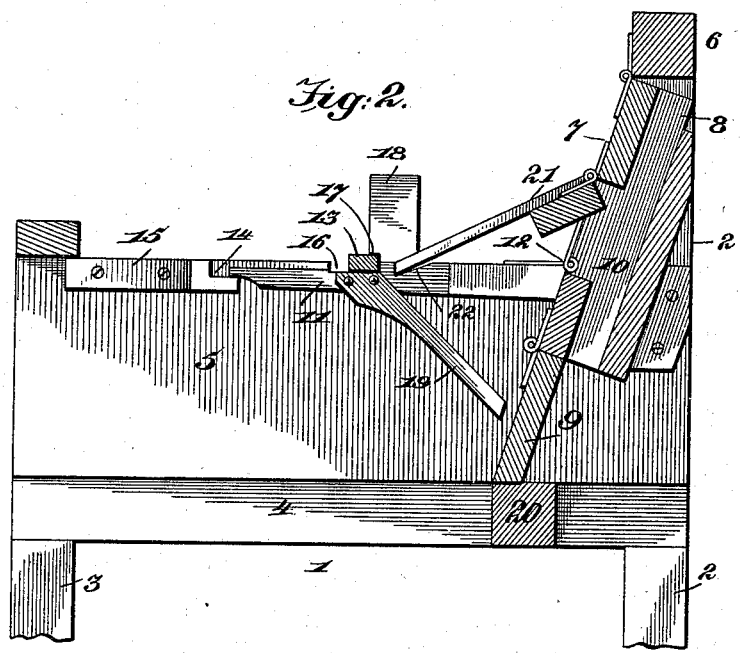
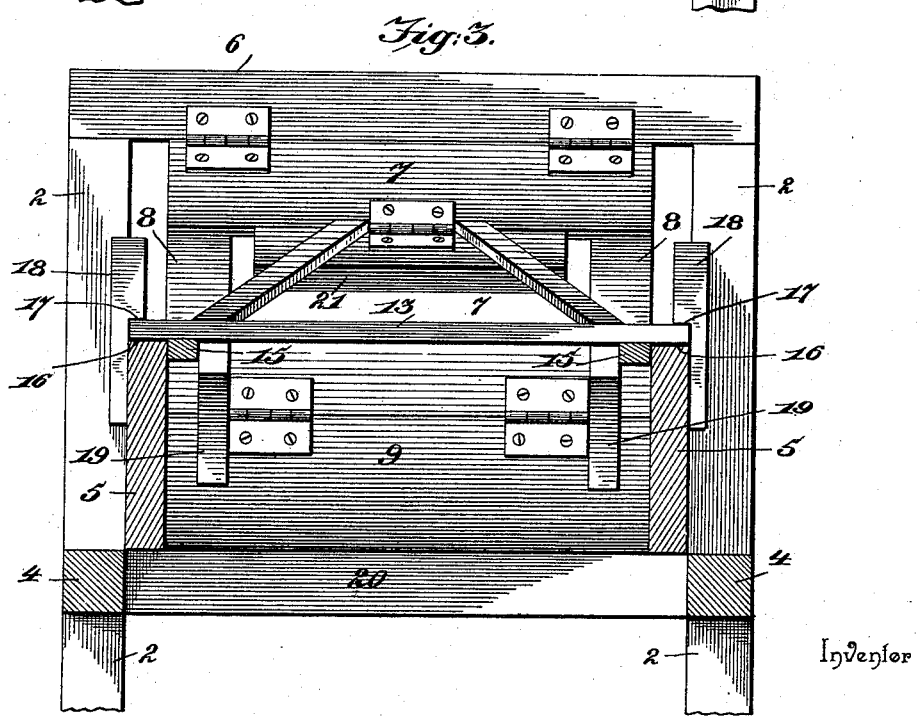
Witnesses
H. G. Dieterich
J. F. Riley
Inventor
William O. Phillips
By his Attorneys,
C. A. Snow & Co.

UNITED STATES PATENT OFFICE.

WILLIAM O. PHILLIPS, OF CALHOUN, KENTUCKY.

FLOOD-GATE.

SPECIFICATION forming part of Letters Patent No. 580,892, dated April 20, 1897.

Application filed March 8, 1897. Serial No. 626,491. (No model.)

*To all whom it may concern:*

Be it known that I, WILLIAM O. PHILLIPS, a citizen of the United States, residing at Calhoun, in the county of McLean and State of Kentucky, have invented a new and useful Flood-Gate, of which the following is a specification.

The invention relates to improvements in flood-gates.

The object of the present invention is to improve the construction of flood-gates and to provide a simple and efficient one which will open automatically when the water rises and which will effectively exclude hogs and other animals.

The invention consists in the construction and novel combination and arrangement of parts, as hereinafter fully described, illustrated in the drawings, and pointed out in the claims hereto appended.

In the drawings, Figure 1 is a perspective view of a flood-gate constructed in accordance with this invention. Fig. 2 is a longitudinal section. Fig. 3 is a transverse section.

Like numerals of reference designate corresponding parts in the several figures of the drawings.

1 designates a supporting-frame comprising vertical posts 2 and 3, longitudinal bottom sills 4, and side pieces 5, which connect the posts. The posts 2, which face upstream, are of greater height than the posts 3 and are connected by a top cross-piece 6, to which is hinged a gate 7, and the latter, which is supported in an inclined position by strips 8, is provided at its bottom with a hinged leaf 9. The strips or blocks 8 are secured to the inner faces of the sides of the frame at the front thereof, as clearly shown in Fig. 2 of the accompanying drawings, and the gate 7, which is hinged at its upper edge, is hollow to form a water-passage 10, which is open at the bottom of the gate 7 and near the top of the gate at the rear side thereof.

The hinged gate 7 is held normally closed by a latch 11, which prevents hogs and other animals from opening the gate when the water is low. The latch 11 is composed of longitudinal side pieces disposed substantially horizontally and hinged at their front ends at 12 to the gate 7 and the cross-piece 13, which connects the side pieces of the latch and which projects laterally therefrom. The rear ends of the sides of the latch engage recesses of the sides of the supporting-frame, such recesses 14 being preferably formed in cleats 15, secured to the inner faces of the sides near the upper edges thereof. The projecting ends of the cross-piece 13, which connects the sides of the latch, are arranged in recesses 16 of the sides of the frame and are engaged by shoulders 17 of blocks 18. The blocks 18 are secured to the sides of the frame adjacent to the recesses 16 and prevent the cross-bar 13 and the side pieces of the latch from swinging directly upward.

The latch is operated by the hinged leaf 9 of the gate, and it is provided at opposite sides with depending arms 19, secured to the side pieces of the latch and inclining downward and forward in the direction of the hinged leaf 9. When the water rises, the hinged leaf is swung rearward and engages the depending arms of the latch, moving the latter rearward sufficiently to disengage the projecting ends of the cross-bar 13 from the shoulders 17 of the blocks 18 and lifting them out of engagement with the recesses of the sides of the frame. By this construction the latch is maintained in position to permit the flood-gate to swing upward and open when a flood comes.

The supporting-frame is provided with a transverse sill or beam 20, located in advance of the lower edge of the hinged leaf of the gate and forming a guard for the same to prevent hogs and other animals from operating the gate. In order to prevent pigs from lifting the hinged leaf, a catch 21 is employed and is hinged to the gate 7, near the top thereof. The catch 21, which is provided with a pair of diverging arms, engages notches 22 of the sides of the latch in order to throw the weight of the gate 7 against the latch, so as to make the hinged leaf too heavy for a pig to lift.

It will be seen that the flood-gate is simple, strong, and durable, that it is positive and reliable in operation, and that, while it is adapted to open automatically to permit water to pass through it, it effectually prevents hogs and other animals from operating it.

Changes in the form, proportion, and minor details of construction may be resorted to without departing from the spirit or sacrificing any of the advantages of this invention.

What is claimed is—

1. In a flood-gate, the combination of a supporting-frame, a gate hinged at its upper edge to the supporting-frame and provided at its bottom with a hinged leaf, and an upwardly-swinging catch hinged at its front to the body of the gate, extending rearward therefrom and provided with a depending arm arranged to be engaged by the hinged leaf, substantially as described.

2. In a flood-gate, the combination of a supporting-frame, a flood-gate hinged at its top to the same and provided at its bottom with a hinged leaf, a latch hinged at its front end to the gate and composed of side pieces engaging the supporting-frame, and a catch hinged to the upper portion of the gate and engaging the side pieces of the latch, substantially as described.

3. In a flood-gate, the combination of a supporting-frame provided at the upper edges of its sides with shoulders, a gate hinged at its top to the supporting-frame and provided at its bottom with a hinged leaf, a latch disposed substantially horizontally, hinged at its front to the gate and composed of side bars engaging the supporting-frame, and a cross-bar connecting the side bars and engaging the said shoulders, and arms depending from the side bars and arranged to be engaged by the hinged leaf, substantially as described.

4. In a flood-gate, the combination of a supporting-frame having a transverse sill, a gate hinged at its top to the supporting-frame in advance of the sill and provided at its bottom with a hinged leaf resting upon said sill, strips or blocks secured to the sides of the supporting-frame and supporting the gate in an inclined position, and a latch mounted on the gate and engaging the supporting-frame and provided with an arm arranged to be engaged by the hinged leaf, substantially as described.

5. In a flood-gate, the combination of a supporting-frame, a gate hinged at its top to the frame and provided with a passage extending upward from its bottom and opening at the back of the gate near the top thereof, a hinged leaf arranged at the bottom of the gate, a latch mounted on the gate, provided with side bars and engaging the supporting-frame, and a hinged catch mounted on the gate at the upper terminus of the passage and provided with arms engaging the side bars of the latch, substantially as described.

In testimony that I claim the foregoing as my own I have hereto affixed my signature in the presence of two witnesses.

WILLIAM O. PHILLIPS.

Witnesses:
BEN F. LANDRUM,
F. A. LOCHRY.